US011190020B2

(12) United States Patent
Wang et al.

(10) Patent No.: US 11,190,020 B2
(45) Date of Patent: Nov. 30, 2021

(54) DIRECT CURRENT VOLTAGE COORDINATION CONTROL METHOD

(71) Applicants: NR ELECTRIC CO., LTD, Nanjing (CN); NR ENGINEERING CO., LTD, Nanjing (CN)

(72) Inventors: Nannan Wang, Nanjing (CN); Yu Lu, Nanjing (CN); Yunlong Dong, Nanjing (CN); Jie Tian, Nanjing (CN); Dongming Cao, Nanjing (CN); Haiying Li, Nanjing (CN); Chongxue Jiang, Nanjing (CN); Jiacheng Wang, Nanjing (CN)

(73) Assignees: NR ELECTRIC CO., LTD, Nanjing (CN); NR ENGINEERING CO., LTD, Nanjing (CN)

(*) Notice: Subject to any disclaimer, the term of this patent is extended or adjusted under 35 U.S.C. 154(b) by 0 days.

(21) Appl. No.: 16/643,472

(22) PCT Filed: May 7, 2018

(86) PCT No.: PCT/CN2018/085842
§ 371 (c)(1),
(2) Date: Feb. 28, 2020

(87) PCT Pub. No.: WO2019/047546
PCT Pub. Date: Mar. 14, 2019

(65) Prior Publication Data
US 2020/0366096 A1 Nov. 19, 2020

(30) Foreign Application Priority Data

Sep. 5, 2017 (CN) .......................... 201710788486.3

(51) Int. Cl.
*H02J 3/36* (2006.01)
*H02J 3/12* (2006.01)
*H02J 1/10* (2006.01)

(52) U.S. Cl.
CPC .................. *H02J 3/36* (2013.01); *H02J 3/12* (2013.01); *H02J 1/102* (2013.01); *H02J 1/106* (2020.01)

(58) Field of Classification Search
CPC ...... H02J 3/36; H02J 3/12; H02J 1/102; H02J 1/106
See application file for complete search history.

(56) References Cited

U.S. PATENT DOCUMENTS 3,526,780 A * 9/1970 Danfors .................... H02J 3/36
307/82
4,419,591 A * 12/1983 Irokawa .................... H02J 3/36
307/45
(Continued)

FOREIGN PATENT DOCUMENTS

CN 103346582 A 10/2013
CN 103606945 A 2/2014
(Continued)

OTHER PUBLICATIONS

WIPO, Chinese International Search Authority, International Search Report with English translation and Written Opinion dated Aug. 13, 2018 in International Patent Application No. PCT/CN2018/085842, 10 pages.

*Primary Examiner* — Harry R Behm
(74) *Attorney, Agent, or Firm* — Masuvalley & Partners

(57) ABSTRACT

A DC voltage coordination control method is applied to a multi-terminal VSC-HVDC power transmission system or a VSC-HVDC power grid system. When a lower-level control is used in the active power control mode, the active power reference value of the converter is generated according to the converter DC voltage and the converter DC voltage
(Continued)

active power curve; it also includes an upper-level control to adjust the control mode and active power setting value of the lower-level control to ensure the steady-state performance of the system. This method has low dependence on communication, avoids the problem that the fixed slope and margin cannot meet all operating conditions, and is suitable for large-scale VSC-HVDC systems, and has scalability.

6 Claims, 3 Drawing Sheets

(56) References Cited

U.S. PATENT DOCUMENTS

| | | | |
|---|---|---|---|
| 8,760,888 B2* | 6/2014 | Jiang-Hafner | H02M 5/40 363/35 |
| 2006/0282239 A1* | 12/2006 | Chu | H02J 3/36 703/2 |
| 2016/0308359 A1 | 10/2016 | Dong et al. | |
| 2019/0140445 A1* | 5/2019 | Takano | H02J 3/28 |

FOREIGN PATENT DOCUMENTS

| | | |
|---|---|---|
| CN | 104505853 A | 4/2015 |
| CN | 105281356 A | 1/2016 |
| CN | 107093893 A | 8/2017 |

* cited by examiner

DIRECT CURRENT VOLTAGE COORDINATION CONTROL METHOD

RELATED APPLICATIONS

This application is the U.S. National Phase of and claims priority to International Patent Application No. PCT/CN2018/085842, International Filing Date May 7, 2018, entitled Direct Current Voltage Coordination Control Method; which claims benefit of Chinese Application No. 201710788486.3 filed Sep. 5, 2017; both of which are incorporated herein by reference in their entireties.

TECHNICAL FIELD

The present invention belongs to the technical field of VSC-HVDC transmission of power systems, and particularly relates to a DC voltage coordination control method.

BACKGROUND

With the advancement of power electronic devices and control technology, the capacity and voltage class of VSC-HVDC systems are getting higher and higher, and they are developing towards multi-terminal and DC power grids. Multi-terminal VSC-HVDC and VSC-HVDC power grids have better operational flexibility and reliability than two-terminal VSC-HVDC power transmission, and they have greater advantages in the construction of large-scale VSC-HVDC power grids, which can meet grid interconnection, urban grid power supply, interconnection of multiple wind farms (new energy), etc. However, with the increase in the scale of VSC-HVDC systems and the increase in the number of converters, the complexity of coordination control between multiple converters is greatly increased. How to ensure the DC voltage stability of VSC-HVDC systems to construct multiple converter station systems becomes a difficulty of the scale expansion of the VSC-HVDC power grids.

Commonly used coordination control methods for multi-terminal VSC-HVDC power transmission include master-slave control, DC voltage difference control, and DC voltage margin control. These control methods mainly have problems such as high communication dependence, complex settings for slope and margin, etc. With the increase of the scale of the VSC-HVDC system, these problems become more prominent. In order to solve these problems, a large-scale VSC-HVDC power transmission system needs a highly scalable DC voltage coordination control strategy to achieve coordination control of multiple converters and ensure good performance under steady-state and transient-state.

SUMMARY OF THE INVENTION

The purpose of the present invention is to provide a scalable DC voltage coordination control method. The method is implemented by upper-level control and lower-level control. The upper-level control ensures the steady-state performance of the system and the lower-level control ensures the transient-state performance and stability of the system. During the lower-level control, since the operating characteristics of the converter are self-adjusted according to the power setting value of the converter, the method avoids the problem that the fixed slope and margin cannot meet all operating conditions, and is suitable for large-scale multi-terminal VSC-HVDC systems and VSC-HVDC power grid systems.

In order to achieve the above objective, the technical solutions adopted by the present invention are described as below:

a DC voltage coordination control method applied to a multi-terminal VSC-HVDC power transmission system or a VSC-HVDC power grid system, includes a lower-level control that generates an active power reference value of the converter according to a control mode of the converter; the control mode of the converter is a DC voltage control mode or an active power control mode;

some or all of the converters of the multi-terminal VSC-HVDC power transmission system or the VSC-HVDC power grid system are configured with the lower-level control, and the lower-level control of any converter including the following steps:

1) turning to step 2) if the converter control mode is the DC voltage control mode, otherwise turning to step 3);

2) generating the active power reference value of the converter according to the difference of the DC voltage reference and the converter DC voltage, and turning to step 1);

3) generating a DC voltage active power curve of the converter according to an active power setting value of the converter, then turning to step 4);

4) generating the active power reference value of the converter according to the converter DC voltage and the DC voltage active power curve of the converter, then turning to step 1).

In the above-mentioned DC voltage coordination control method, generating a DC voltage active power curve of the converter according to an active power setting value of the converter in step 3) of the lower-level control includes the following steps:

1) determining an inflection point 1 of the DC voltage active power curve according to a ultimate maximum DC voltage and a maximum inversion active power;

2) determining an inflection point 2 of the DC voltage active power curve according to a maximum DC voltage and an active power setting value;

3) determining an inflection point 3 of the DC voltage active power curve according to a minimum DC voltage and the active power setting value;

4) determining an inflection point 4 of the DC voltage active power curve according to a ultimate minimum DC voltage and a maximum rectification active power;

5) generating the DC voltage active power curve by a polyline determined from the above inflection point 1, inflection point 2, inflection point 3 and inflection point 4, wherein the active power is the maximum inversion active power if the DC voltage is greater than the ultimate maximum DC voltage, and the active power is the maximum rectification active power if the DC voltage is less than the ultimate minimum DC voltage;

the ultimate maximum DC voltage, the maximum DC voltage, the minimum DC voltage, and the ultimate minimum DC voltage are preset values determined according to system study, and the ultimate maximum DC voltage the maximum DC voltage the minimum DC voltage the ultimate minimum DC voltage; and the maximum inversion active power is the maximum active power when the converter is operating in an inversion state, the maximum rectification active power is the maximum active power when the converter is operating in a rectification state, the maximum inversion active power and the maximum rectification active power are both determined according to system study;

in the step 4) of the lower-level control, the active power reference value of the converter obtained by retrieving the DC voltage active power curve of the converter and determining the active power corresponding to the measured converter DC voltage as the active power reference value of the converter.

In the above-mentioned DC voltage coordination control method, in the step 2) of the lower-level control, generating the active power reference value of the converter according to the difference of the DC voltage reference and the converter DC voltage is achieved by using the difference through a proportional-integral controller to obtain the active power reference value of the converter.

The above-mentioned DC voltage coordination control method is characterized in that the method further comprising an upper-level control, and the upper-level control adjusting the control mode of the lower-level control and the active power setting value, the upper-level control comprising the following steps:

(1) monitoring the state of the control mode of each converter; sending the instruction of switching to the DC voltage control mode to the converter with the highest priority according to the preset priority, when no operating converters which are interconnected at the DC side are in the DC voltage control mode; sending the instruction of switching to the active power control mode to the other converters other than the converter with the highest priority, which are operated in the DC voltage control mode, when a plurality of the operating converters which are interconnected at the DC side are in the DC voltage control mode, then turning to step 2);

(2) monitoring the overload state of the converters in voltage control mode and send the overload state to the lower-level control of other converters which are interconnected at the DC side of the overload converters, then turning to step 1); the overload state is one of a rectification overload or an invertion overload;

when the upper-level control is included, the lower-level control further comprising the following steps:

a) turning to step b) once receiving the instruction of switching to the DC voltage control mode from the upper-level control, otherwise turning to step c);

b) switching the control mode of the converter to the DC voltage control mode, then turning to step c);

c) turning to step d) once receiving the instruction of switching to the active power control mode from the upper-level control, otherwise turning to step e);

d) switching the control mode of the converter to the active power control mode, then turning to step e);

e) once receiving the overload state of the upper-level, when the overload state is a rectification overload and the active power setting value of the converter is an inversion power, turning to step f); or when the overload state is an inversion overload and the active power setting value is a rectification power, turning to step f), otherwise turning to step a);

f) reducing the active power setting value of the converter according to a preset step, then turning to step a);

In the above-mentioned DC voltage coordination control method, in the step (1) or step (2) of the upper-level control, the interconnection at the DC side refers to that the DC-side of the converter are connected directly or connected through DC lines.

In the above-mentioned DC voltage coordination control method, in the step (2) of the upper-level control, the rectification overload is an overload that occurs when the converter is in rectification operation, and the inversion overload is an overload that occurs when the converter is in inversion operation.

In the above-mentioned DC voltage coordination control method, in step f) of the lower-level control, the preset step is determined according to system study, with a value ranging from 0 MW to the maximum active power of the converter; reducing the active power setting value of the converter refers to reducing the active power setting value of the converter in the direction of reducing an absolute value of the active power setting value of the converter.

After adopting the above solutions, the beneficial effects of the present invention are:

(1) The DC voltage coordination control method provided by the present invention avoids the problem that the fixed slope and margin cannot meet all operating conditions by self-adjusting the operating characteristics of the converter according to the power setting value of the converter.

(2) The DC voltage coordination control method provided by the present invention can ensure the transient performance and stability of the system in the event of a communication failure, and has a low dependence on communication. In the event of a communication failure, the power setting value can also be adjusted by the operator to avoid out-of-control problems when losing the upper-control.

(3) The DC voltage coordination control method provided by the present invention can only use a lower-level control for some converters according to the system conditions, which is suitable for large-scale VSC-HVDC systems and has scalability.

(4) The DC voltage coordination control method provided by the present invention allocates the active power adjustment amount of each converter according to the standby adjustment capacity of the converter, so that a converter with a large standby capacity can adjust more active power, beneficial to maintain the stability of the DC voltage.

(5) According to the DC voltage coordination control method provided by the present invention, the adjustment of the operating characteristics of the converter depends only on the power setting value of the converter, so that the method is simple and reliable.

DESCRIPTION OF EMBODIMENTS

The technical solution of the present invention will be described in detail below with reference to the drawings and specific embodiments.

Figure 1:
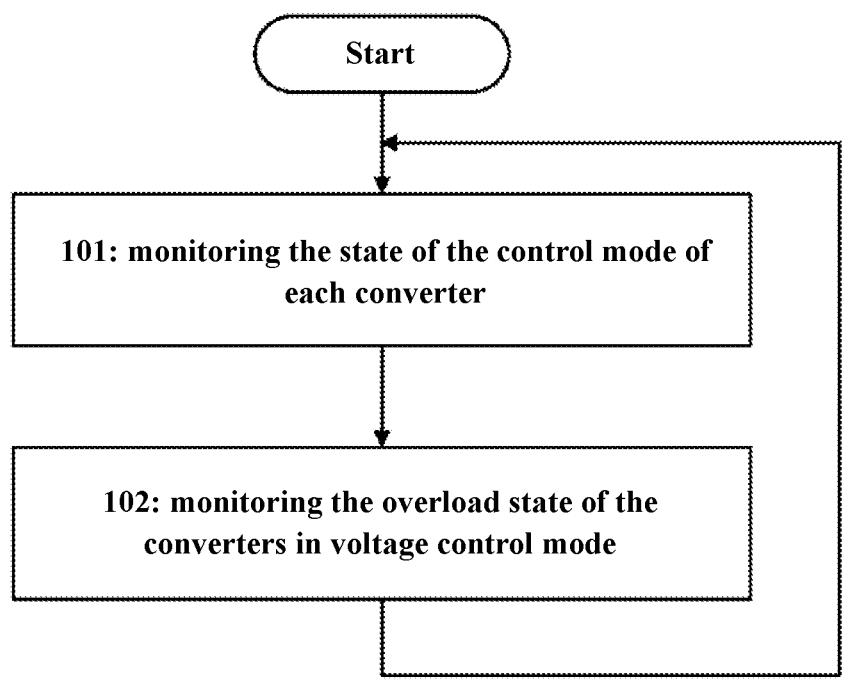
FIG. 1 is an upper-level control flowchart.

FIG. 1 is a flowchart of the upper-level control. When the upper-level control is included, the upper-level control adjusts the control mode and active power setting value of the lower-level control, and the lower-level control adjusts the external operating characteristics of the corresponding converter, including two steps:

Step 101: monitoring the state of the control mode of each converter: when no operating converters which are interconnected at the DC side are in the DC voltage control mode, at this time, there is no converter using the DC voltage control mode in the interconnected system to balance the DC power, thus the instruction of switching to the DC voltage control mode is sent to the converter with the highest priority according to the preset priority; the instruction of switching to the active power control mode is sent to the other converters other than the converter with the highest priority, which are operated in the DC voltage control mode, when a plurality of the operating converters which are interconnected at the DC side are in the DC voltage control mode, to keep only one converter in the interconnected system is in DC voltage control mode;

Step 102: monitoring the overload state of the converters in voltage control mode: the overload state is sent to the lower-level control of other converters which are interconnected at the DC side of the overload converters, the overload state is one of a rectification overload or an inversion overload, wherein the rectification overload is an overload that occurs when the converter is in rectification operation, and the inversion overload is an overload that occurs when the converter is in inversion operation. After receiving the overload state, the lower-level control adjusts the active power setting value to achieve the adjustment of the external operating characteristics.

Figure 2:
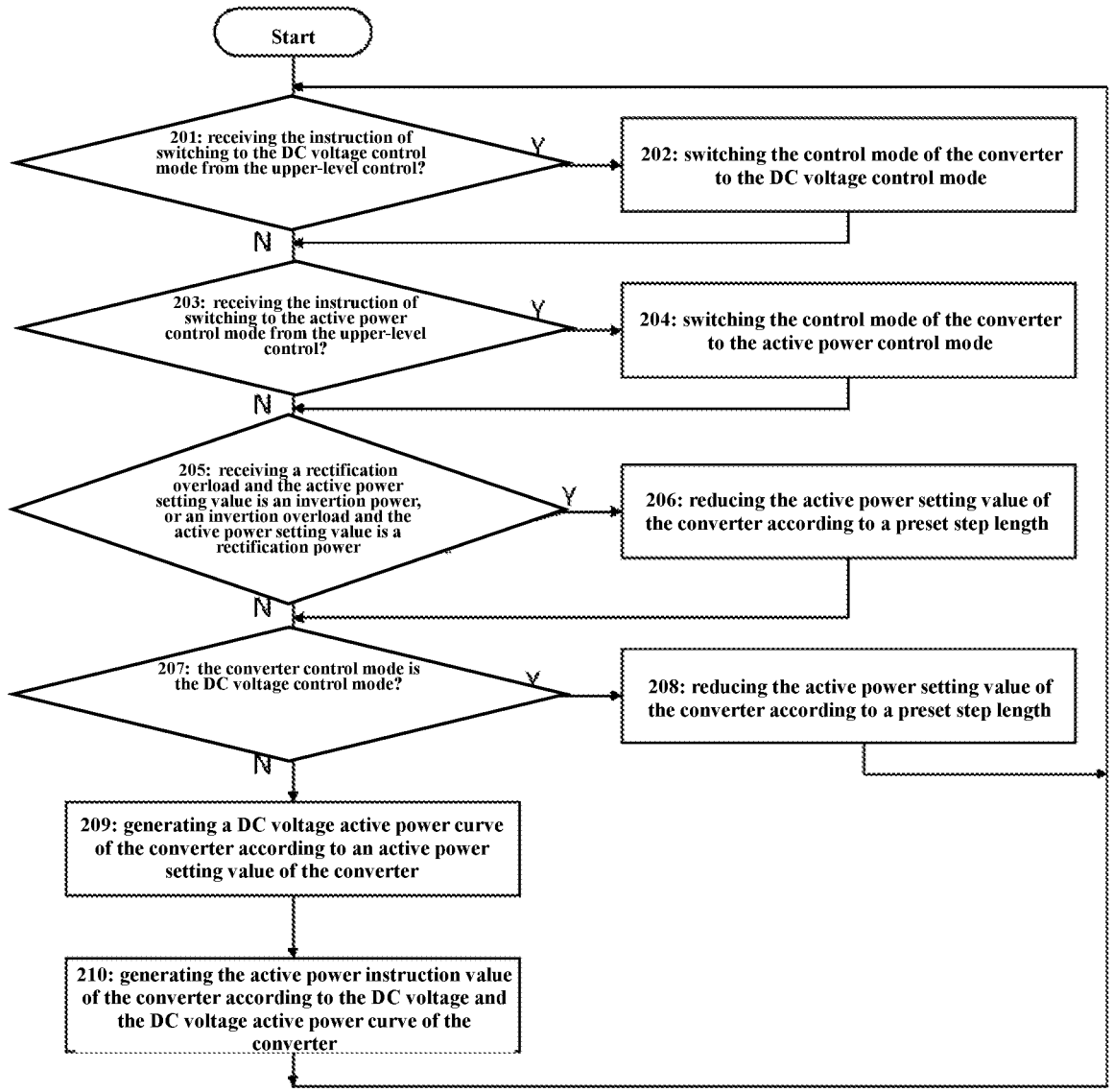
FIG. 2 is a lower-level control flowchart.

FIG. 2 is a flowchart of the lower-level control. When the DC voltage coordination control includes an upper-level control, the lower-level control includes the following steps:

Step 201: turning to step 202 once receiving the instruction of switching to the DC voltage control mode from the upper-level control, otherwise turning to step 203;

Step 202: switching the control mode of the converter to the DC voltage control mode, then turning to step 203;

Step 203: turning to step 204 once receiving the instruction of switching to the active power control mode from the upper-level control, otherwise turning to step 205;

Step 204: switching the control mode of the converter to the active power control mode, then turning to step 205;

Step 205: once receiving the overload state of the upper-level, when the overload state is a rectification overload and the active power setting value of the converter is an inversion power, turning to step 206; or when the overload state is an inversion overload and the active power setting value is a rectification power, turning to step 206, otherwise turning to step 207;

Step 206: reducing the active power setting value of the converter according to a preset step, then turning to step 207; the preset step is determined according to system study, with a value ranging from 0 MW to the maximum active power of the converter, if the step length is 1 MW, then 1 MW of the active power setting value will be reduced for each execution cycle; reducing the active power setting value of the converter refers to reducing the active power setting value of the converter in the direction of reducing an absolute value of the active power setting value of the converter; if the active power setting value in the previous execution cycle is 100 MW, which is in the rectification direction, then the setting value of the active power in the present execution cycle is 99 MW; if the setting value of the active power in the previous execution cycle is −100 MW, which is in the inversion direction, then the setting value of the active power in present execution cycle is −99 MW since only the value is reduced.

Step 207: turning to step 208 if the converter control mode is the DC voltage control mode, otherwise turning to step 209;

Step 208: generating the active power reference value of the converter according to the difference of the DC voltage instruction and the converter DC voltage, and turning to step 201; this step uses a DC voltage controller to control the DC voltage as a target value to generate the converter active power reference value.

Step 209: generating a DC voltage active power curve of the converter according to an active power setting value of the converter, then turning to step 210;

Step 210: generating the active power reference value of the converter according to the converter DC voltage and the DC voltage active power curve of the converter, then turning to step 201. Preferably, the DC voltage of the converter may be the inter-electrode voltage of the converter.

When the upper-level control is not configured, steps 201 to 206 may be omitted.

The lower-level control is configured in the converter control, which is arranged at a lower control level to improve the reliability of the control system. The upper-level control can be configured at any position as needed, in a distributed configuration with the lower-level control, and interacting with the lower-level control through communication. In large-scale VSC-HVDC system applications, only some converters with strong adjustment capabilities are configured with lower-level control according to the system conditions, and some converters configured with lower-level control are used for maintaining DC voltage stability.

Figure 3:
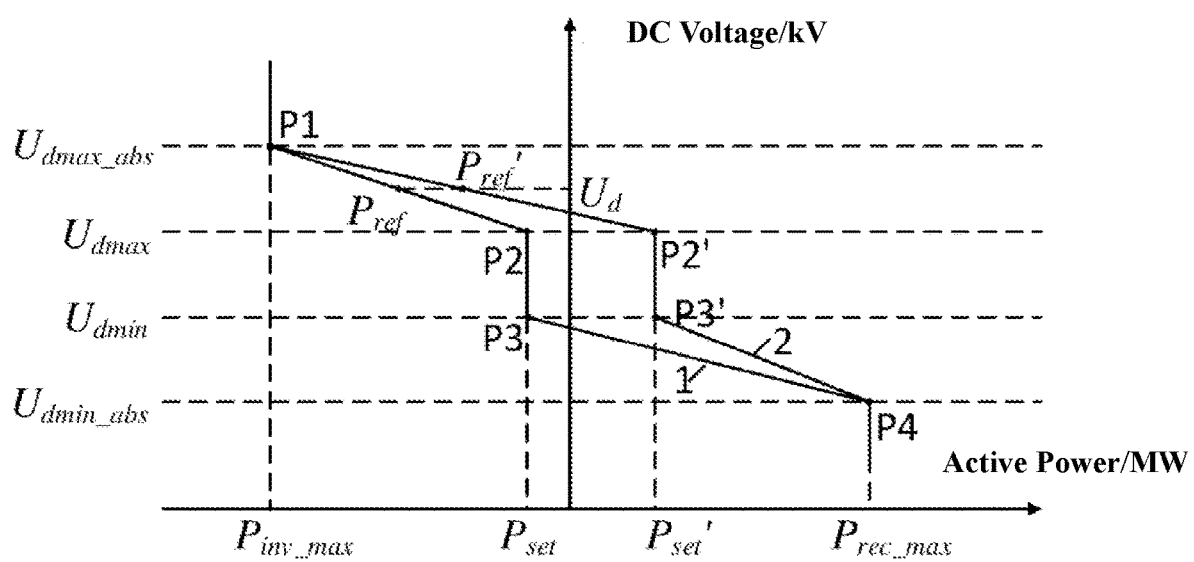
FIG. 3 is a schematic diagram of the DC voltage active power curve of the converter.

FIG. 3 is a schematic diagram of a DC voltage active power curve of the converter, and the above steps 209 and 210 are further described in combination with the figure. $U_{dmax\_abs}$ is the ultimate maximum DC voltage, $U_{dmax}$ is the maximum DC voltage, $U_{dmin\_abs}$ is the ultimate minimum DC voltage, $U_{dmin}$ is the minimum DC voltage, $P_{inv\_max}$ is the maximum inversion active power, and $P_{rec\_max}$ is the maximum rectification active power, both determined according to system study. Preferably, the ultimate maximum DC U voltage $U_{dmax\_abs}$ can be determined according to the DC overvoltage setting value, the maximum DC U voltage $U_{dmax}$ can be determined according to the highest voltage value during steady-state operation, the ultimate minimum DC U voltage $U_{dmin\_abs}$ can be determined according to the DC low voltage setting value, and the minimum DC voltage $U_{dmin}$ can be determined according to the minimum voltage value during steady-state operation. The inversion inverter maximum active power $P_{inv\_max}$ is determined based on the maximum active power when the converter is operating in an inversion state. The rectified maximum active power $P_{rec\_max}$ can be determined based on the maximum active power when the converter is operating in a rectification state. The above determination refers to taking an appropriate reliability factor.

When the active power setting value is $P_{set}$, the DC voltage active power curve 1 can be determined by inflection points P1, P2, P3, and P4, where P1=($P_{inv\_max}$, $U_{dmax\_abs}$), P2=($P_{set}$, $U_{dmax}$), P3=($P_{set}$, $U_{dmin}$), P4=($P_{rec\_max}$, $U_{dmin\_abs}$); when the active power setting value is $P_{set}'$, another DC voltage active power curve 2 can be determined by the inflection points P1, P2', P3', and P4, where P1=($P_{inv\_max}$, $U_{dmax\_abs}$), P2'=($P_{set}'$, $U_{dmax}$), P3'=($P_{set}'$, $U_{dmin}$), P4=($P_{rec\_max}$, $U_{dmin\_abs}$).

The active power reference value of the converter can be generated according to the converter DC voltage and the DC voltage active power curve of the converter. For example, when the DC voltage sampling value is $U_d$, the active power reference value $P_{ref}$ can be obtained according to the DC voltage active power curve 1, the active power reference value $P_{ref}'$ can be obtained according to the DC voltage active power curve 2. For the same converter, when the active power setting value is adjusted from $P_{set}$ to $P_{set}'$, the operating characteristics of the converter are automatically adjusted. In steady state, $P_{ref}=P_{set}$ and $P_{ref}'=P_{set}'$; in the event of overvoltage or undervoltage, the power of the converter is changed to maintain the DC power balance according to the standby adjustment capacity. For example, when the overvoltage reaches the DC voltage $U_d$, the adjustment amount of the power instruction value of the converter and the standby adjustment capacity of the converter is proportional, that is:

$$\frac{P_{set} - P_{ref}}{P_{set}' - P_{ref}'} = \frac{P_{set} - P_{inv\_max}}{P_{set}' - P_{inv\_max}}$$

Among them, $P_{set}-P_{inv\_max}$ is the standby adjustment capacity when the active power setting value is $P_{set}$, and $P_{set}'-P_{inv\_max}$ is the standby adjustment capacity when the active power setting value is $P_{set}'$. Similarly, for two different converters, when the active power setting values are $P_{set}$ and $P_{set}'$, respectively, when overvoltage or undervoltage occurs, the active power adjustment amount of each converter can also be allocated according to the standby adjustment capacity, so that the converter with large standby capacity can adjust more active power to keep the DC voltage stable.

The above embodiments are only for explaining the technical idea of the present invention, and cannot be used to ultimate the protection scope of the present invention. Any modification made on the basis of the technical solution according to the technical idea proposed by the present invention falls within the protection scope of the present invention.

What is claimed is:

1. A DC voltage coordination control method applied to a multi-terminal VSC-HVDC power transmission system or a VSC-HVDC power grid system, characterized in that it includes a lower-level control that generates an active power reference value of a converter according to a control mode of the converter; the control mode of the converter is a DC voltage control mode or an active power control mode;

some or all converters of the multi-terminal VSC-HVDC power transmission system or the VSC-HVDC power grid system are configured with the lower-level control, and the lower-level control of any converter including the following steps:

1) turning to step 2) if the converter control mode is the DC voltage control mode, otherwise turning to step 3);
2) generating the active power reference value of the converter according to the difference of a DC voltage instruction and a converter DC voltage, and turning to step 1);
3) generating a DC voltage active power curve of the converter according to an active power setting value of the converter, then turning to step 4);
4) generating the active power reference value of the converter according to the converter DC voltage and the DC voltage active power curve of the converter, then turning to step 1);

wherein generating a DC voltage active power curve of the converter according to an active power setting value of the converter in step 3) of the lower-level control includes the following steps:

301) determining an inflection point 1 of the DC voltage active power curve according to a ultimate maximum DC voltage and a maximum inversion active power;
302) determining an inflection point 2 of the DC voltage active power curve according to a maximum DC voltage and an active power setting value;
303) determining an inflection point 3 of the DC voltage active power curve according to a minimum DC voltage and the active power setting value;
304) determining an inflection point 4 of the DC voltage active power curve according to a ultimate minimum DC voltage and a maximum rectification active power;
305) generating the DC voltage active power curve by sectionalized broken lines determined from the above inflection point 1, inflection point 2, inflection point 3 and inflection point 4, wherein the active power is the maximum inversion active power if the DC voltage is greater than the ultimate maximum DC voltage, and the active power is the maximum rectification active power if the DC voltage is less than the ultimate minimum DC voltage;

the ultimate maximum DC voltage, the maximum DC voltage, the minimum DC voltage, and the ultimate minimum DC voltage are preset values, and the ultimate maximum DC voltage the maximum DC voltage the minimum DC voltage the ultimate minimum DC voltage; and the maximum inversion active power is the maximum active power when the converter is operating in an inversion state, the maximum rectification active power is the maximum active power when the converter is operating in a rectification state, the maximum inversion active power and the maximum rectification active power are both determined according to a system study;

in the step 4) of the lower-level control, the active power reference value of the converter obtained by retrieving the DC voltage active power curve of the converter and determining the active power corresponding to the measured converter DC voltage as the active power reference value of the converter.

2. The DC voltage coordination control method according to claim 1, characterized in that: in the step 2) of the lower-level control, generating the active power reference value of the converter according to the difference of the DC voltage instruction and the converter DC voltage is achieved by using the difference through a proportional-integral controller to obtain the active power reference value of the converter.

3. The DC voltage coordination control method according to claim 1, characterized in that: the method further comprising an upper-level control, and the upper-level control adjusting the control mode of the lower-level control and the active power setting value, the upper-level control comprising the following steps:

(1) monitoring the state of the control mode of each converter; sending a instruction of switching to the DC voltage control mode to the converter with a highest priority according to a preset priority, when no operating converters which are interconnected at the DC side are in the DC voltage control mode; sending the instruction of switching to the active power control mode to the other converters other than the converter with the highest priority, which are operated in the DC voltage control mode, when a plurality of the operating converters which are interconnected at the DC side are in the DC voltage control mode, then turning to step 2);
(2) monitoring the overload state of the converters in voltage control mode and sending the overload state to the lower-level control of other converters which are interconnected at the DC side of the overload converters, then turning to step 1); the overload state is one of a rectification overload or an inversion overload;

when the upper-level control is included, the lower-level control further comprising the following steps:
a) turning to step b) once receiving the instruction of switching to the DC voltage control mode from the upper-level control, otherwise turning to step c);
b) switching the control mode of the converter to the DC voltage control mode, then turning to step c);
c) turning to step d) once receiving the instruction of switching to the active power control mode from the upper-level control, otherwise turning to step 5);
d) switching the control mode of the converter to the active power control mode, then turning to step e);
e) once receiving the overload state of the upper-level, when the overload state is a rectification overload and the active power setting value of the converter is an inversion power, turning to step f); or when the overload state is an inversion overload and the active power setting value is a rectification power, turning to step f), otherwise turning to step a);
f) reducing the active power setting value of the converter according to a preset step, then turning to step a).

4. The DC voltage coordination control method according to claim 3, characterized in that: in the step (1) or step (2) of the upper-level control, the interconnection at the DC side refers to that the DC-side of the converter are connected directly or connected through DC lines.

5. The DC voltage coordination control method according to claim 3, characterized in that: in the step (2) of the upper-level control, the rectification overload is an overload that occurs when the converter is in rectification operation, and the inversion overload is an overload that occurs when the converter is in inversion operation.

6. The DC voltage coordination control method according to claim 3, characterized in that: in step f) of the lower-level control, the preset step is determined according to system study, with a value ranging from 0 MW to the maximum active power of the converter; reducing the active power setting value of the converter refers to reducing the active power setting value of the converter in the direction of reducing an absolute value of the active power setting value of the converter.

\* \* \* \* \*

UNITED STATES PATENT AND TRADEMARK OFFICE
CERTIFICATE OF CORRECTION

PATENT NO.         : 11,190,020 B2
APPLICATION NO.    : 16/643472
DATED              : November 30, 2021
INVENTOR(S)        : Nannan Wang et al.

Page 1 of 1

It is certified that error appears in the above-identified patent and that said Letters Patent is hereby corrected as shown below:

In the Claims

Column 8, Line 20: After both instances of "voltage", insert -- $\geq$ --.

Column 8, Line 21: After "voltage", insert -- $\geq$ --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*